US011252780B2

(12) United States Patent
Kumar et al.

(10) Patent No.: US 11,252,780 B2
(45) Date of Patent: Feb. 15, 2022

(54) WIRELESS EMERGENCY ALERT END DETERMINATION

(71) Applicant: Apple Inc., Cupertino, CA (US)

(72) Inventors: Utkarsh Kumar, Fremont, CA (US); Srinivasan Nimmala, San Jose, CA (US); Yifan Zhu, San Jose, CA (US); Lakshmi N. Kavuri, Cupertino, CA (US); Vijay Venkataraman, San Jose, CA (US); Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/995,106

(22) Filed: Aug. 17, 2020

(65) Prior Publication Data

US 2021/0092796 A1  Mar. 25, 2021

Related U.S. Application Data

(60) Provisional application No. 62/904,838, filed on Sep. 24, 2019.

(51) Int. Cl.
| | |
|---|---|
| *H04W 76/50* | (2018.01) |
| *H04W 4/12* | (2009.01) |
| *H04W 4/06* | (2009.01) |
| *H04W 4/90* | (2018.01) |

(52) U.S. Cl.
CPC .............. *H04W 76/50* (2018.02); *H04W 4/06* (2013.01); *H04W 4/12* (2013.01); *H04W 4/90* (2018.02)

(58) Field of Classification Search
CPC ........... H04W 4/90; H04W 4/06; H04W 4/12; H04W 76/50

USPC ............................................ 455/404.1, 404.2
See application file for complete search history.

(56) References Cited

U.S. PATENT DOCUMENTS

| | | | |
|---|---|---|---|
| 8,755,824 B1 | 6/2014 | Wang et al. | |
| 8,890,685 B1 * | 11/2014 | Sookman | G08B 25/008 340/539.13 |
| 9,167,381 B2 | 10/2015 | Mcdonald et al. | |
| 9,609,479 B1 | 3/2017 | Bostick et al. | |
| 9,672,538 B1 | 6/2017 | Vaynblat et al. | |
| 10,051,103 B1 * | 8/2018 | Gordon | G06F 21/36 |
| 10,075,812 B1 | 9/2018 | Deluca et al. | |
| 10,091,612 B2 | 10/2018 | Yocam et al. | |

(Continued)

FOREIGN PATENT DOCUMENTS

WO       2014200504 A1    12/2014

OTHER PUBLICATIONS

Geofencing alerts to come to Find My Friends this fall Caldwell, Serenity macworld.com article, Jun. 14, 2012.

*Primary Examiner* — Joel Ajayi
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to determine whether or not a mobile alert message is in effect. Such a determination may be based on a cancellation message (or other message(s) received from the network, possibly in response to a query from the UE. Alternatively or additionally, such a determination may be based on monitoring rebroadcasts of the alert and/or determining that no rebroadcast has been received for a period of time.

20 Claims, 11 Drawing Sheets

(56) References Cited

U.S. PATENT DOCUMENTS

| | | | |
|---|---|---|---|
| 2013/0324166 A1* | 12/2013 | Mian | H04W 4/021 |
| | | | 455/457 |
| 2014/0375480 A1* | 12/2014 | Morgan | H04W 4/021 |
| | | | 340/990 |
| 2016/0057572 A1 | 2/2016 | Bojorquez Alfaro et al. | |
| 2018/0288570 A1* | 10/2018 | Bakshi | H04L 67/20 |

* cited by examiner

WIRELESS EMERGENCY ALERT END DETERMINATION

PRIORITY CLAIM

This application claims priority to U.S. provisional patent application Ser. No. 62/904,838, entitled "Commercial Mobile Alert System End Indication," filed Sep. 24, 2019, which is hereby incorporated by reference in its entirety as though fully and completely set forth herein.

TECHNICAL FIELD

The present application relates to wireless devices, and more particularly to apparatuses, systems, and methods for alert indications.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, emergency alerts may be provided to wireless devices, e.g., using a wireless emergency alert (WEA). Recent regulatory requirements may specify that such alerts include geofencing. Geofencing may lead to increased energy usage for wireless devices in some circumstances. Thus, improvements in the field are desirable.

SUMMARY

Techniques, apparatuses, systems, and methods are disclosed for a network to provide and for a user equipment (UE) device to receive a mobile alert, e.g., using a wireless emergency alert (WEA). The UE may determine whether the mobile alert remains active. If the alert does not remain active, the UE may discontinue monitoring a geofence associated with the alert and/or may determine not to provide (or change the manner of providing) the alert to the user.

In some embodiments, after sending a mobile alert, the network may provide an end-indication to the UE(s) that received the alert. For example, the network may forward an end-indication to alert such UE(s) that the alert is no longer active. In some embodiments, a UE may determine that a mobile alert is no longer active based on monitoring for and/or the absence of rebroadcasts of the alert. In some embodiments, a UE may request information from a network regarding one or more active or inactive alerts.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
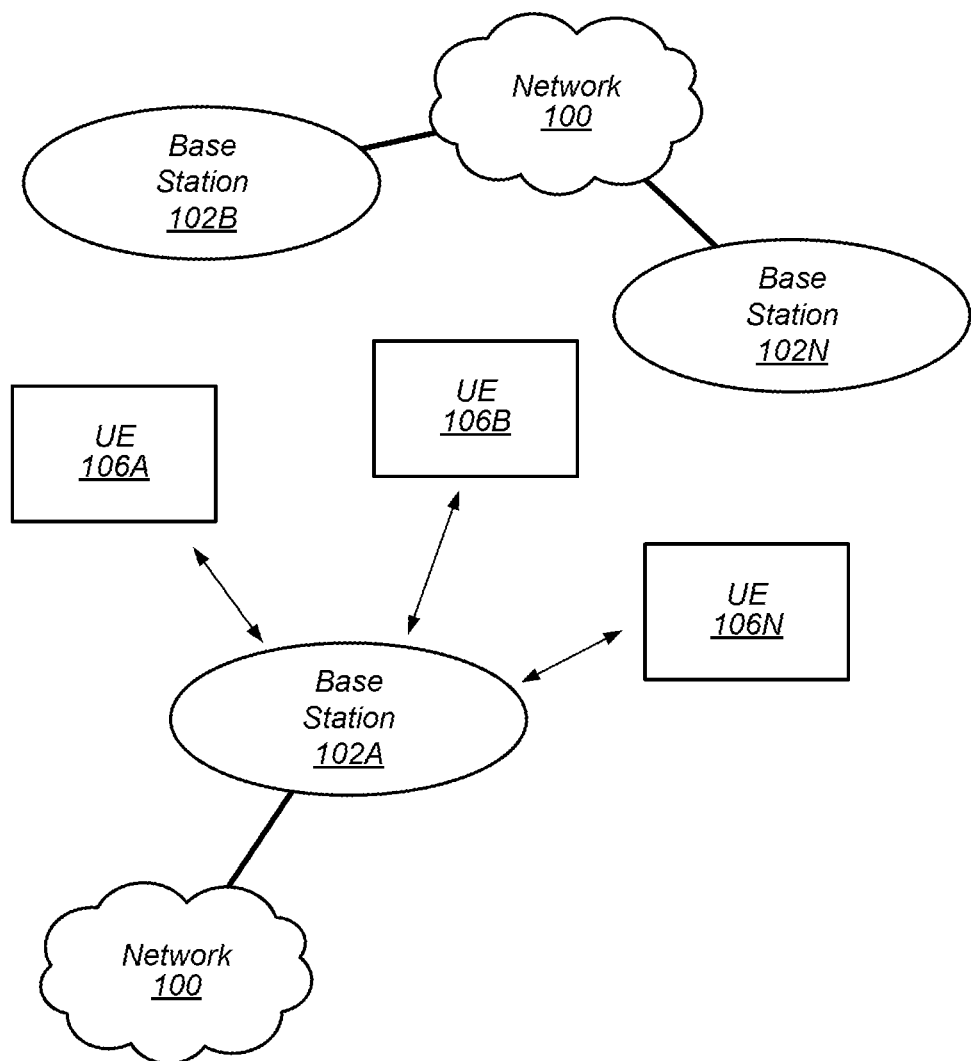
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:

UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
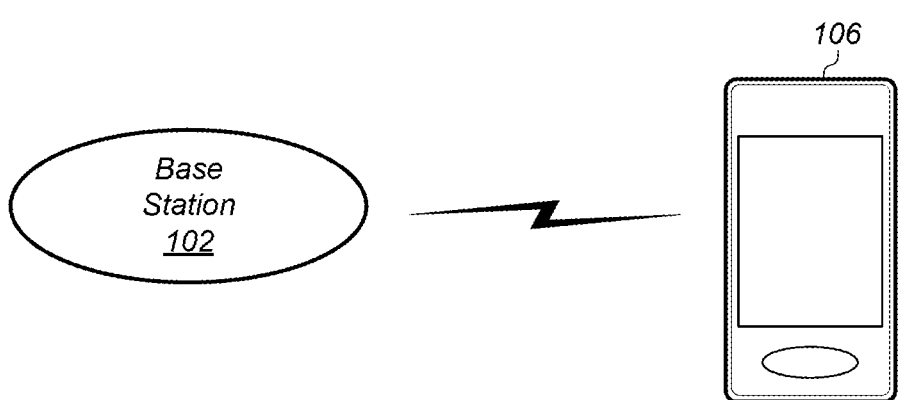
FIG. 2 illustrates a base station (BS) in communication with a user equipment device (UE), according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
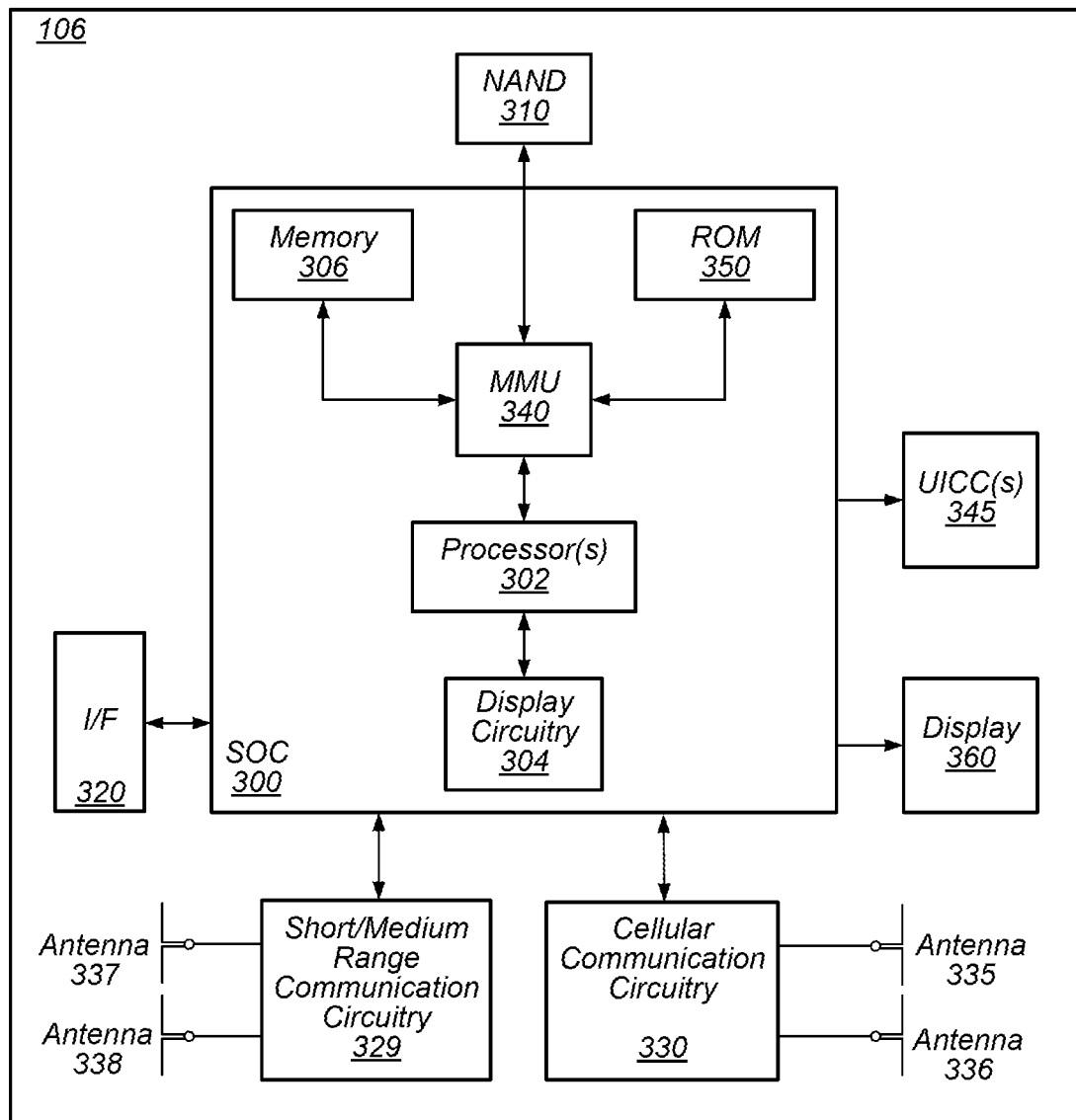
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
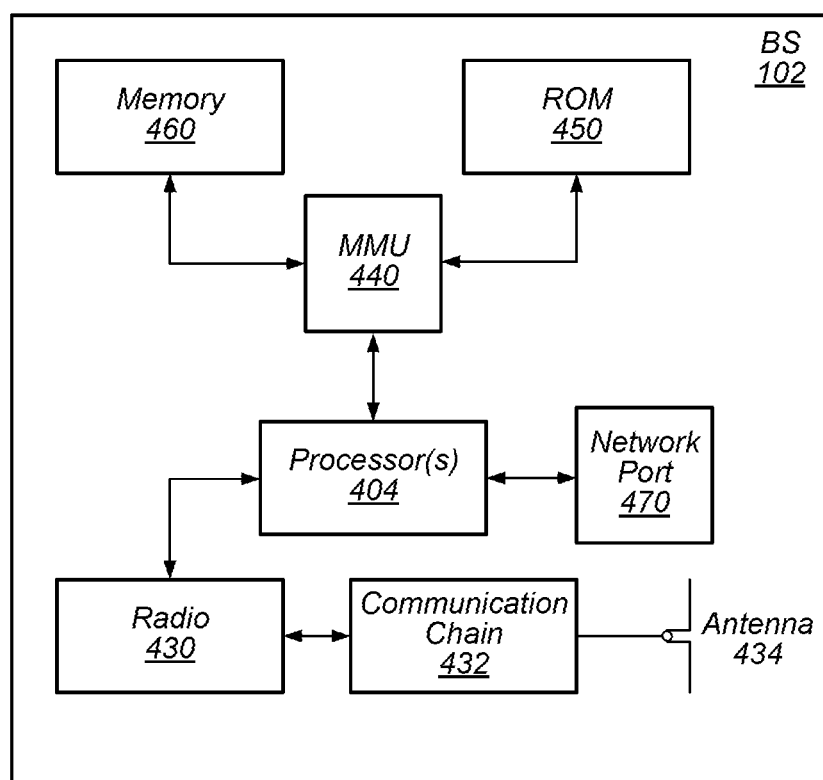
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
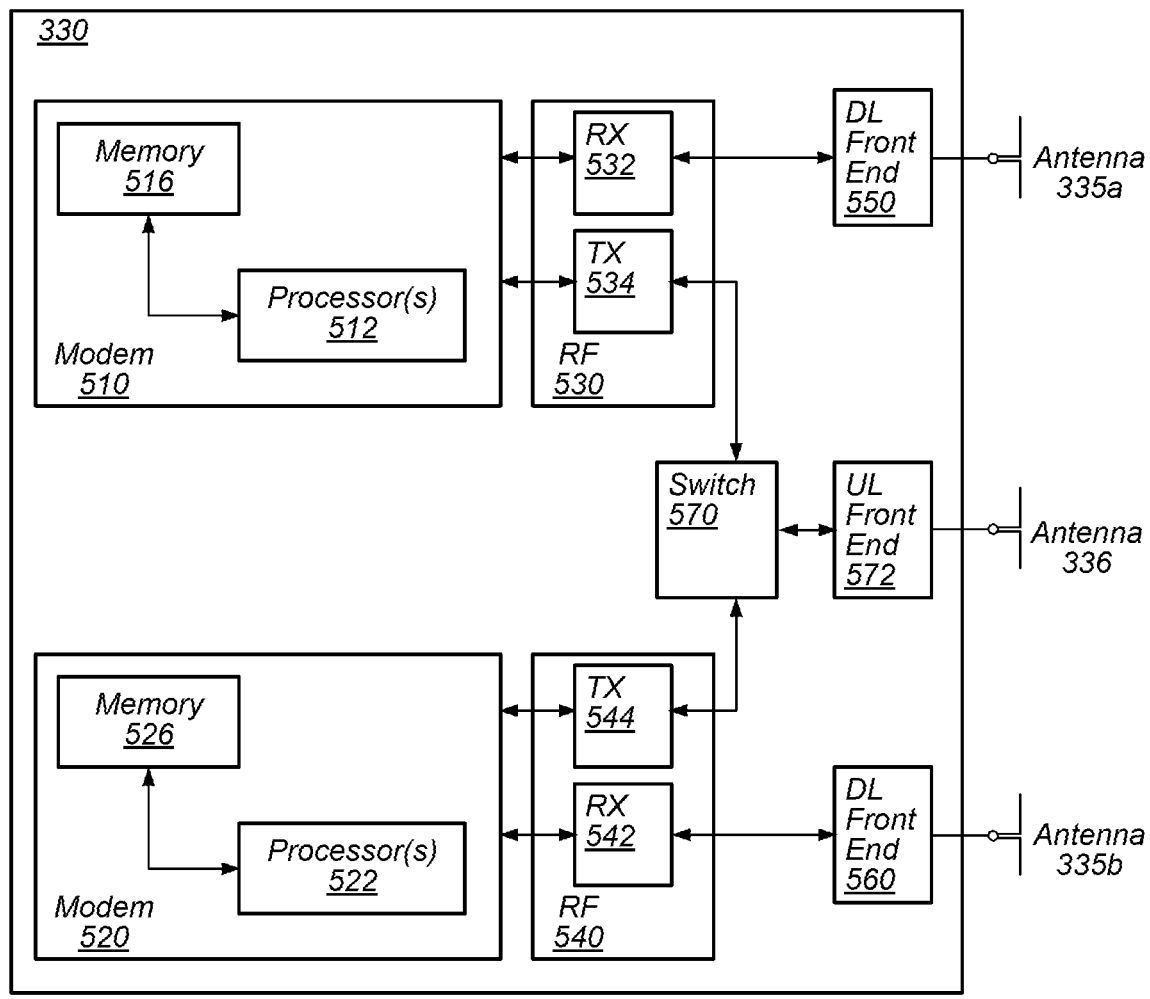
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
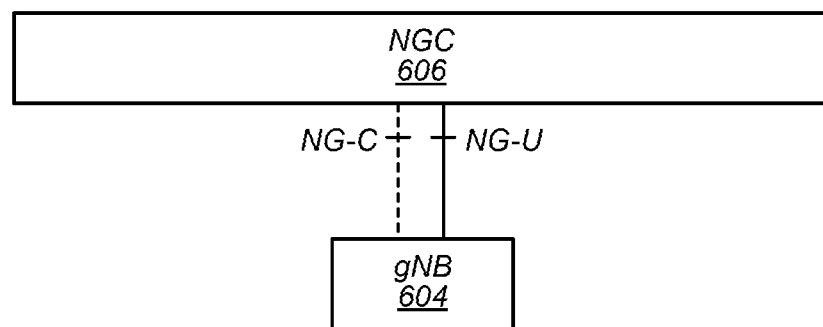
FIGS. 6 and 7 illustrate examples of a 5G NR base station (gNB), according to some embodiments.
Figure 7:
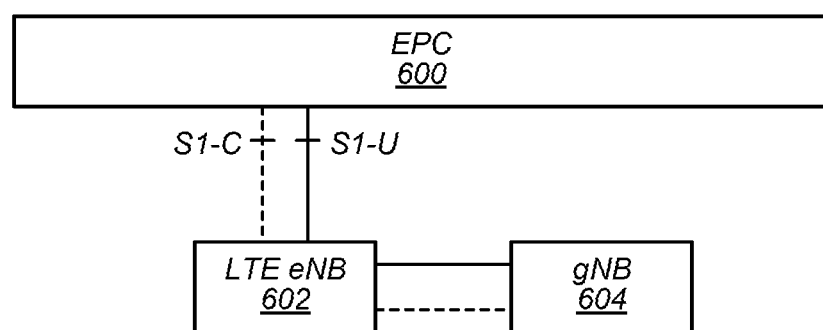

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
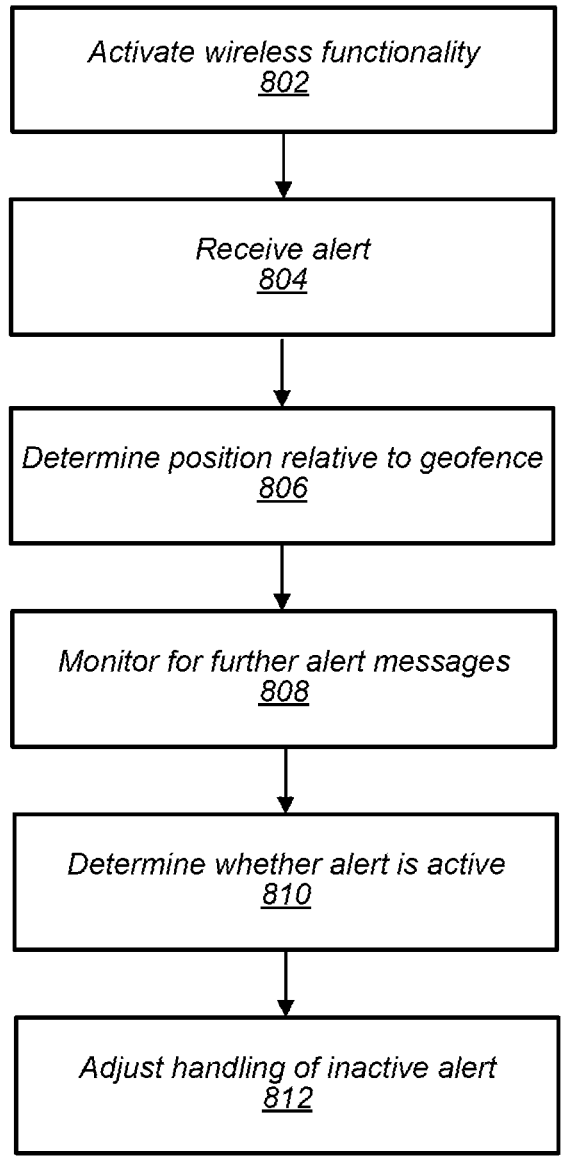
FIG. 8 is a flow chart diagram illustrating an example method for determining whether a mobile alert is active, according to some embodiments.

FIG. 8—Deactivating Monitoring of a Mobile Alert

Commercial mobile alert system (CMAS), now renamed as wireless emergency alert (WEA), may be a system for providing alerts to wireless devices such as UEs about emergencies or other urgent information. Geofencing may allow for users to receive WEA within a particular geographic region. For example, the region may be an n-geofence polygon which may represent the affected region. In the United States, the Federal Communications Commission (FCC) has mandated this feature for November 2019. Specifically, geofence parameters that were previously being sent to a cell broadcast center (CBC) may now be sent to the UE(s) as well, according to some embodiments. UEs may then use the geofence (e.g., an area such as a polygon which may be indicated by geofence parameters included with an alert), in combination with location information, to determine whether or not the particular UE is within the geofence polygon (e.g., a point-in-polygon check). A UE within the polygon may provide the WEA alert to the user, while a UE that is outside the polygon may not provide the WEA alert to the user.

The Alliance for Telecommunications Industry Solutions (ATIS) has published standard ATIS-0700041 which explains how geofencing can be done on the device side, e.g., device based geofencing (DBGF). ATIS-0700041 provides a mechanism for transmitting geofence parameters along with the existing WEA. Both the WEA and geofence parameters may be broadcast over system information blocks (SIBs). The geofence parameters may be transmitted in a new optional TLV called Wireless Area Coordinates (WAC). The geofence parameters may include a list of circles and/or polygons and optionally a geofencing Maximum wait time. Circles may be represented by a center (e.g., a pair of latitude and longitude coordinates) and a radius (e.g., in Kilometers). Polygons may be represented by a list of latitude/longitude pairs. The maximum wait time value may be an integer which may be optionally transmitted along with the circles and/or polygons. For example, the maximum wait time value may be between 0 and 255, according to some embodiments. The maximum wait time may be a timer which may pose certain limits on a maximum allowed duration for the UE to determine its own location in order to perform geofencing. The UE may be expected to perform geofencing (e.g., by turning on and/or using its global navigational satellite systems such as global positioning system (GPS) and/or other chipsets) and determine if it is inside any of the transmitted shapes (circles and polygons). If it is unable to determine its location within the maximum wait time, the UE may display the alert. In some cases, maximum wait time may be determined by the UE itself.

A purpose of geofencing may be to provide more granular information to the UEs which implement geofencing while being backward compatible. In some instances, the UE may determine that it is definitively (e.g., or with a high degree of confidence) outside of the affected area and accordingly may not display the alert to the user. In such cases, geofencing may reduce or avoid various negative impacts (e.g., due to a potentially alarming alert being provided to people less likely to be immediately impacted by the emergency related to the alert). For example, upon receiving a wireless emergency alert (WEA) when a UE is inside the geofence indicated by the WEA, the UE may be expected to display the alert. When a UE is outside the geofence indicated by a WEA, the ATIS specification recommends that the UE may store the alert for future display. The UE may then wait for a wireless handset action message (WHAM) as defined in ATIS-070041 to do geofencing. WHAM contains a list of alerts for which a UE should perform geofencing again. When a WHAM is received the UE may perform geofencing again using the list of stored shapes for that alert. In other words, the UE may perform a point-in-polygon check and/or point-in-circle check (e.g., a geofence check) for the received alert identifiers, and if the UE is inside the geofence it may display a stored alert. In other words, a WHAM may act as a trigger to perform a check of the UE's position relative to a geofence for the alert identifier(s) listed in the WHAM and the ATIS recommendation may be to do a geofence check each time a WHAM is received.

In some embodiments, WHAM may be one of the key triggers for displaying an alert upon entering an affected area. However, a UE may choose to perform geofencing checks (e.g., at its own cadence) without waiting for WHAM. Because of this, geofencing may have a large impact on power use (e.g., battery life and/or other aspects of UE performance) when a UE is not in the geofence. For example, a UE outside the geofence may repeatedly perform geofence checks to determine whether or not it has entered the geofence polygon (e.g., and therefore should display the alert for the user). Such periodic checks may be performed for an amount of time which may be fixed (e.g., by the network (e.g., using RRC) and/or by an applicable standard) and/or may be determined by the UE (e.g., based on one or more factors such as motion, proximity to the geofence area, battery level, signaling from the network, type of the alert, other parameters of the alert, etc.). For example, to perform such a check, a UE may activate one or more means of determining position (e.g., global navigational satellite systems such as global positioning system (GPS), Bluetooth (BT) (e.g., to receive location information from a companion device), wireless local area network (WLAN) (e.g., Wi-fi), cellular triangulation, motion sensing, etc.) every time a WEA message related to the alert (e.g., WHAM) is received (e.g., on a 15 second cadence in some cases, but any pattern/frequency of alerts may be used, or the messages may be aperiodic). Also, a network (e.g., due to an error and/or attack) may send several WHAMs (e.g., at a very high periodicity or frequency). A large number of WHAMs in a short time may cause a very quick battery drain for the UE. Because of this, the UE may choose its own cadence for doing geofencing and not completely rely on WHAM. The algorithm to choose the geofence cadence may be a function of WHAM periodicity and/or type of alert. For example, emergency warnings may be handled differently when compared to Amber alerts, etc.

In some embodiments, the end (e.g., cancellation or expiration, etc.) of a WEA may not be known on the UE side, e.g., because there is currently no protocol (either 3GPP or ATIS) for the UE to learn such information. The end of effectiveness of a WEA only translates to the WEA (e.g., and/or related WHAM) no longer being broadcasted over the air. From a UE standpoint, not receiving an alert (e.g., for a period of time) may not necessarily mean that the alert is no longer active. This may not present a problem for normal (e.g., non-geofenced) alerts (e.g., since the decision of whether or not to display the alert is instantaneous, e.g., based on detection of a duplicate alert, e.g., non-duplicate alerts may be displayed). However, for geofencing alerts, uncertainty related to the end of an alert may be problematic for the UE, e.g., because the alert is stored in the device for future use.

Not knowing the end of a geofencing alert may create a problem in various ways. For example, after receiving a WEA while the UE is outside the geofence, if the user enters an out of service (OOS) state at a later time, the UE may not know if the alert is active or not (since there may be no end-indication for WEA). It is possible that the network is still periodically broadcasting the alert, but the device may have missed recent broadcasts since it was OOS. Thus, if the device enters the geofence, it may not know whether or not it should display the alert. This problem may be solved by the techniques of FIG. 8, e.g., mechanisms for the UE to know that the alert is no longer active (e.g., before or after entering OOS).

Further, uncertainty related to the end of a geofenced alert may lead to battery concerns. Some UEs may setup a geofence and continue to monitor a region, e.g., based on the initial WEA. Thus, these UEs may not wait for a WHAM to make a decision on displaying an alert inside the geofence. Not knowing an end of the alert, may make it more difficult to know what needs to be done when inside a geofence (e.g., to display the alert or not, note that displaying an old/inactive alert may needlessly frighten or confuse a user and may be completely out of context) and/or when the UE should bring the geofence down. For example, 3GPP standards may indicate that a UE can store an alert for a period not greater than 24 hours. But the alert broadcast may have stopped in 2 hours. Accordingly, monitoring the geofence (e.g., unnecessarily) for an extended period of time (e.g., after the second hour) may use considerable battery energy.

FIG. 8 is a flow diagram which illustrates exemplary aspects of a scheme for advanced handling of wireless emergency alerts for geofencing. The techniques of FIG. 8 may allow for a UE to determine whether or not an alert is in effect and whether or how to provide information about the alert to the user. Aspects of the method of FIG. 8 may be implemented by a UE 106 in communication with a BS 102, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.) may cause the UE or base station(s) to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP and/or ATIS specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may activate its wireless functionality (802), according to some embodiments. For example, the UE 106 may power up cellular circuitry. In some embodiments, the UE may establish a connection with a BS 102. The connection may be or include a cellular connection, e.g., operating according to one or more wireless standards. The UE and BS may exchange data and/or control information, e.g., in the uplink (UL) and/or downlink (DL) directions. For example, the UE may camp on a cell provided by BS 102. In some embodiments, the UE may not exchange data or control information with the BS.

The UE 106 may receive an alert (e.g., a WEA) transmitted by the BS 102 (804), according to some embodiments. The alert may include any, all, or none of: geofence parameters (e.g., a specification of a geofence such as coordinates for one or more points defining boundaries of the geofence polygon or coordinates for the center of a circle and a corresponding radius, etc.), a timer (e.g., max-wait-time) within which UE should do geofencing, e.g., indicating that if the UE cannot complete geofencing within the timer, it should display the alert), identification information (e.g., a message identifier (ID) corresponding to the alert and/or a serial number corresponding to the particular message (e.g., multiple serial numbers may correspond to a single message ID)), a format ID, a message for display to the user (e.g., with text about the nature of the emergency, alert, etc.), and/or other information/fields.

In some embodiments, the alert may include information indicating timing of transmission of further messages about the alert (e.g., one or more WHAM messages). For example, the alert may include an indication of a schedule of transmission of WHAM messages (e.g., every x seconds, etc.). Similarly, the alert may specify a maximum amount of time that the alert will remain in effect (e.g., the alert will expire at a particular time, and if the emergency or other situation related to the alert is still on going, a new alert will be issued at or after the particular time). In various embodiments, the UE may use such timing information and/or its own monitoring of the periodicity of WHAM and/or WEA and use that information for determining whether or not a given WEA is still active.

In some embodiments, the BS may transmit the alert multiple times (e.g., periodically). Thus, the UE may receive the same alert more than once. The UE may perform duplicate detection on received alerts (e.g., based on serial number and/or message ID) to determine whether an alert is a copy of a previously received alert. The UE may discard or disregard duplicate alerts.

The UE 106 may determine whether it is within the geofence (806), according to some embodiments. In other words, the UE may determine its location and compare the location to the geofence to determine if it is inside of the geofence or outside of the geofence (e.g., a point-in-polygon check or other geofence check).

In some embodiments, the determination of whether the device is inside the geofence may be based on (e.g., in response to) receiving a WHAM message. In other words, as suggested by ATIS, the UE may perform a point-in-polygon or other geofence check in response to receiving a WHAM.

In some embodiments, however, geofences may be setup based on receiving the alert (e.g., in 804). Thus, the UE may monitor its location relative to the geofence and may determine whether it is inside or outside of the geofence at any time. For example, when a WHAM is received, the UE may already know its location relative to the geofence, e.g., based on monitoring its location over time. Further, in some embodiments, a UE may track the incoming WEA alerts and create and/or recreate geofences on the fly depending on periodicity of the alert(s). Therefore, such UEs may not need to perform a geofence check (e.g., by determining a current location and comparing to the geofence, e.g., which may be needlessly expensive) in response to receiving a WHAM.

In some embodiments, the UE may maintain multiple alerts for monitoring the geofence(s), e.g., the UE may track geofences related to multiple alerts concurrently. Such multiple alerts may have the same or different geofences.

The UE 106 may monitor for further messages from the BS 102 (e.g., WHAM and/or WEA, among various possibilities) related to the alert (808), according to some embodiments.

In some embodiments, the network (e.g., BS 102) may provide an end indication, e.g., a new type of WHAM message to indicate the end (e.g., expiration, cancellation, etc.) of the alert. Among various possibilities, the message may be a TLV of (e.g., a new) type 3 on the UE side. Similar to existing type 1 and type 2 TLVs (e.g., as defined in ATIS-0700041), this new WHAM segment may carry a new TLV (e.g., type 3, among various possibilities) which may contain a list of one or more message IDs and/or serial numbers. For example, type 3 may include a list of message IDs and/or serial numbers, e.g., identifying one or more unique WEA alert(s) which is/are no longer active. Notably, according to some embodiments, the end of a WEA is indicated to a CBC, but this may only lead to an end of broadcast, and the end of the WEA may not be signaled to the UE(s). Thus, the new type 3 WHAM TLV may be a direct means of forwarding an indication of the end of a specific alert to the UE (e.g., or multiple specific alerts). This indication of the end of an alert (e.g., via a new type 3 WHAM message, among various possibilities) may be sent multiple times to ensure that devices (e.g., in temporary OOS states) have multiple opportunities to receive the indication. The cadence of retransmission of the indication of the end of an alert may be decided by the network, according to some embodiments.

For example, in some embodiments, ATIS 0700041 may be updated as illustrated in Table 1. Table 1 illustrates ATIS section 5.1.3 WHAM tag coding, as modified according to some embodiments. As shown, a new section is added to ATIS-0700041. The new Inactive Alert Identity Tuple List may provide a list of Inactive Alerts. This WHAM TLV may contains a list of inactive WEA alert identity tuples for device based geofencing (DBGF). These may be the alerts which are no longer active. The UE may delete the selected alerts from the list of alerts for active monitoring and may choose to stop geofence monitoring for these alerts.

| Bits | | | | Meaning |
|---|---|---|---|---|
| 8 | 7 | 6 | 5 | |
| 0 | 0 | 0 | 1 | Active Alert Identity Tuple List |
| 0 | 0 | 1 | 0 | Active Alert Identity Tuple List - Common Warning Area Coordinates |
| 0 | 0 | 1 | 1 | Inactive Alert Identity Tuple List - |

-continued

| Bits | | | | Meaning |
|---|---|---|---|---|
| 8 | 7 | 6 | 5 | |
| 1 | 1 | 1 | 1 | Inactive Alerts CMSP Defined Use |
| Other values | | | | reserved for future use |

In some embodiments, the UE may monitor the frequency (e.g., periodicity) of messages (e.g., WHAM and/or WEA, among various possibilities) about the alert, and may infer whether the alert is deactivated (e.g., or expired, etc.), e.g., on its own without any network assistance. In other words, the UE may gather information to inform a UE side algorithm for the determination of how to handle an alert, e.g., to determine whether an alert is or is not active. As per 3GPP, an alert may be stored on the UE for up to 24 hours. In some embodiments WEA and/or WHAM may be broadcast at a certain cadence (e.g., every T minutes or seconds). Thus, a UE may estimate the periodicity of messages related to an alert (T) and may use that information to determine when the alert is no longer active (e.g., based on not receiving the alert (e.g., or a message, such as a WHAM, about the alert) for a number of cycles (e.g., N periods of T minutes or seconds, etc.)). In some embodiments, 3GPP standards documents may be amended in the future to specify that that this inference is valid, e.g., that once the alert is no longer seen at the expected interval (e.g., or for a specified number, e.g., N, of multiples of the interval), it can be inferred that the alert is no longer active. In some embodiments, when an alert is stopped at the network side, the UE may simply stop receiving the alert so this inference may be meaningful nevertheless (e.g., irrespective of the standards stating this as an explicit end of the alert).

The UE may monitor the alert periodicity and use it to reconfigure certain aspects of the geofence to save power. For example, the UE may determine the frequency of alert messages on a given cell (e.g., and/or RAT, tracking area, location area, public land mobile network (PLMN), etc.) by sampling a number of first messages (e.g., the number may be defined by the UE and/or configured by the network, e.g., 3-5 messages, among various possibilities) related to an alert that are received and remembering the periodicity (e.g., T). The UE may then monitor the RAT(s)/tracking area/location area/etc. on which it is camped, and may maintain different periodicity per RAT(s)/tracking area/location area/etc. In other words, a UE may receive messages related to the alert using various connections with potentially different RAT, tracking area, location area, PLMN, cell, etc. In other words, the periodicity may be specific to a RAT, tracking area, location area, PLMN, cell, etc. The UE may maintain different periodicity for these different connections and use this information to predict, the periodicity (e.g., and potentially an end of) an alert. Thus, the UE may detect when/if a message about the alert is not received at the previous periodicity for any of the various connections. For example, if a UE changes location, it may camp on a different connection. The UE may sample alert messages in the new location (e.g., new cell, tracking area, location area, RAT, PLMN, etc.) to determine the periodicity of the new connection, and may use this new periodicity to determine the time(s) at which further messages are expected.

In some embodiments, the UE may maintain different periodicity for multiple alerts. However sometimes multiple alerts may have the same or similar periodicity. In some embodiments, the UE may adjust mechanisms for tracking periodicity to reduce the number of active timers.

The UE 106 may determine whether the alert remains active (810), according to some embodiments.

In some embodiments, based on receiving an explicit end indication (e.g., type 3 TLV or similar message) that an alert is cancelled, expired, or otherwise inactive, the UE may determine that the alert is inactive and may stop geofence monitoring.

In some embodiments, the UE may use a UE side algorithm to determine that an alert is no longer active. As noted above, after determining the periodicity, T, the UE may check if a particular alert message is not received at its expected time window. For example, if no message related to the alert is received in a period of N intervals (e.g., where N may be a threshold determined by the UE and/or determined by the network and signaled to the UE), the UE may determine that the alert is inactive. In some embodiments, the UE may select a number of periods (e.g., value of N) to use for determining that an alert is no longer active based on factors such as signal strength and/or quality. For example, in a situation when the UE has a good connection (e.g., RSRP, SINR, etc. above a threshold(s)), the UE may more quickly (e.g., lower value of N) determine that a message related to an alert has not been received, e.g., in comparison to a situation when the UE's connection is poor (e.g., RSRP, SINR, etc. below the threshold(s)).

In some embodiments, the UE may additionally make sure that there was no cell change and/or OOS triggers at a time that a message would be expected (e.g., a multiple of the period T) which may have led to false indications that a message was not received and that WEA is no longer active. In other words, the UE may discount or otherwise correct for any alert messages that may have been missed due to such circumstances. Similarly, any other trigger which may cause WEA reception failure may be taken into account as per the UE. For example, if any interruption in service at the time of an expected alert message is found, the corresponding interval may not be counted toward the N intervals for which no message is received. Thus, based on not receiving an alert message for N intervals, the UE may conclude that the alert is no longer active.

In some embodiments, a new request and response mechanism may be introduced for the UE to query the network about the status of an alert. For example, the UE may send a dedicated request to the network (e.g., BS 102) requesting the network to broadcast any active or inactive WEA alerts. The UE may send such a query when it detects that for an amount of time (e.g., a threshold amount of time such as an hour or a threshold number of multiple consecutive cycles of T, where the threshold number may be the same or different than N, discussed above), it has not received the any alert messages. In some embodiments, the BS may broadcast a list of active alerts in response to such a query. Such a broadcast may benefit other UEs in the vicinity which may receive the latest list of active alerts. Alternatively, the network may send a dedicated response to this UE providing the list of currently active alerts. Similarly, in some embodiments, the UE may explicitly request the network whether a particular alert (e.g., by ID) is active or inactive currently. The network may respond back by indicating whether the requested alert is still active currently. In of these ways, the UE may receive an indication from the network of whether one or more alerts are no longer active.

In some embodiments, the UE may determine whether an alert is active based on an expiration time of the alert. For example, the alert itself or a WHAM message (or any other message about the alert) may specify an expiration time of an alert. Thus, the UE may compare the current time to a known expiration time to determine whether the alert remains in effect.

Based on a determination that an alert is inactive (e.g., according to any of the embodiments discussed above), the UE may adjust its handling of the alert, e.g., to treat the alert as likely (e.g., or definitely) inactive (812), according to some embodiments. For example, the UE may determine how or if to display the alert to a user. For example, in response to a determination that an alert is inactive, the UE may not display the alert to the user even if the UE enters the geofence area, according to some embodiments. Alternatively, the UE may display the (e.g., expired) alert along with an indication that it is inactive (e.g., via text or a symbol indicating that the alert is inactive and/or greying out the alert, etc., e.g., any mechanism consistent with the user interface which conveys the information to the user may be used).

Further, the UE may disregard the geofence associated with the alert (e.g., the UE may cease monitoring whether or not it is inside the geofence). Various additional or alternative actions that the UE may perform in response to a determination that an alert is inactive are listed below. The particular actions used may depend on the manner that the determination that the alert is inactive was reached (e.g., some actions may be performed in the case that an end indication was received from the network while other actions may be performed in the case that the UE determined the alert is inactive based on a UE side algorithm).

In some embodiments, the UE may delete the alert from an active list, e.g., a list of alerts which are being monitored for geofencing.

In some embodiments, the UE may reduce a storage timer of the alert from 24 hours (e.g., or any other value) to a shorter duration (e.g., 12 hours or any other value). In some embodiments, the reduced duration may be a function of time. For example, the longer that messages related to the alert are not received (e.g., more multiples of T), the shorter the storage timer becomes (e.g., reduce to 4 hours, among various possibilities). In other words, the more expected messages are not received at corresponding expected times, the more the storage timer may be shortened. In some embodiments, the reduced duration may also be a function of the camped RAT, any of various network considerations, whether the UE is or has been OOS etc. For example, if the UE has been OOS at any time since receiving a most recent alert message (e.g., potentially leading to missing more recent alert messages), the UE may not reduce the duration of the storage timer (e.g., as much or at all).

In some embodiments, (e.g., potentially without otherwise determining that an alert is inactive as in 810) the UE may initiate a timer (e.g., M minutes) associated with an alert and may refresh (e.g., reinitiate) this timer whenever an alert message is received. During this period (e.g., prior to expiration of the timer), if the UE enters the geofence, it may display the alert. This approach may provide robustness to various challenges related to OOS time, RAT changes, etc., e.g., with little UE side overhead. In some embodiments, M may be equal to T or may be a multiple of T. T can refer to the periodicity of the alert or WHAM or a timer derived from the two.

In some embodiments, the UE may continue to monitor the geofence, but may monitor the geofence less frequently. For example, if the UE in response to a determination that an alert is likely, but not definitely, inactive, the UE may monitor the geofence using less frequent (and/or less precise) geofence checks.

The techniques of FIG. 8 may provide various benefits. For example, significant power saving may be achieved because of early geofence teardown (e.g., based on a determination that the alert is no longer active). Further, e.g., particularly in the case of an end indication from the network, OOS handling may be improved. For example, based on a determination that the alert is no longer active, the UE may not display the alert (e.g., and thus may avoid unnecessarily alarming users that enter the geofence after the alert is inactive).

Figure 9:
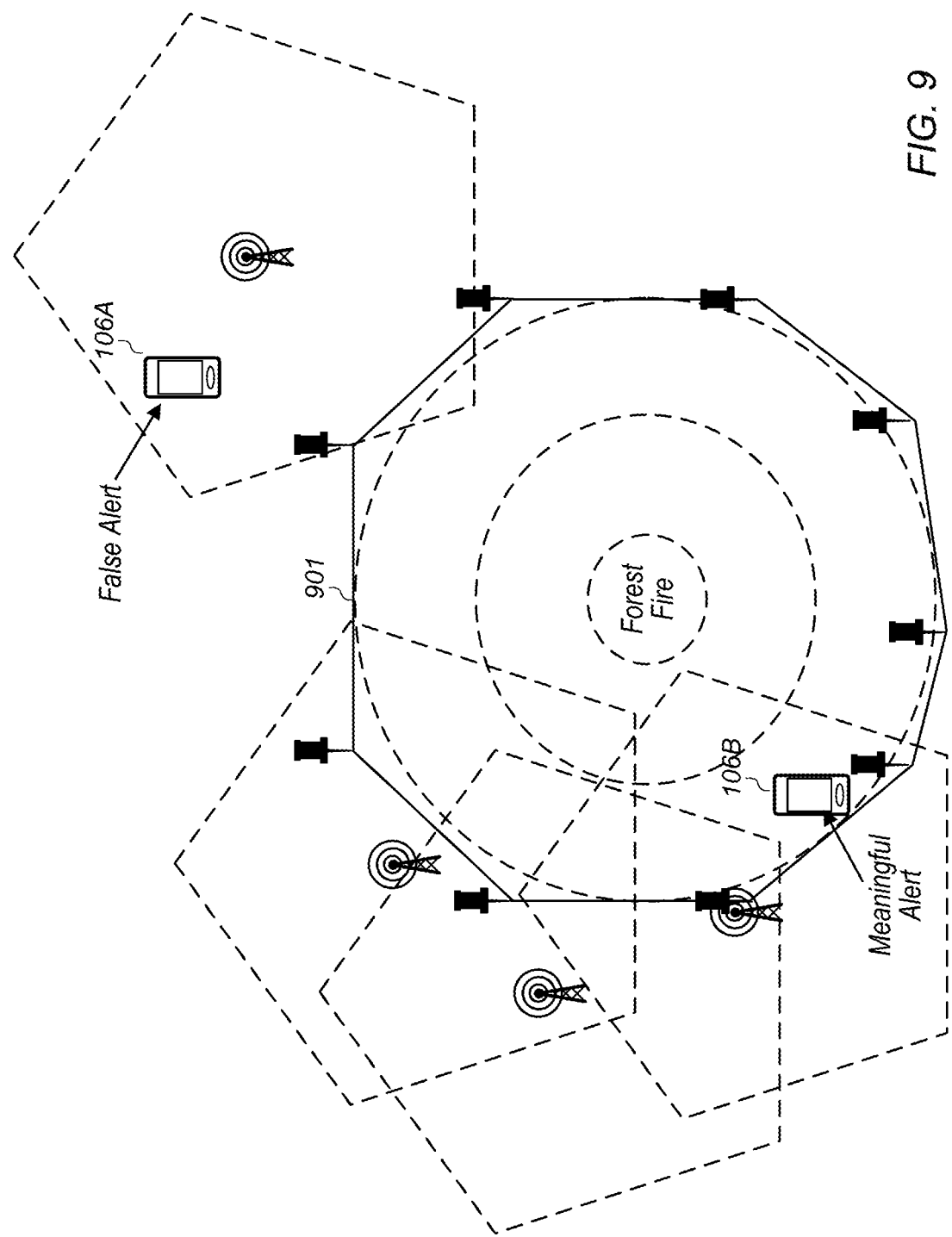
FIGS. 9-11 illustrate WEA and geofencing, according to some embodiments.
Figure 10:
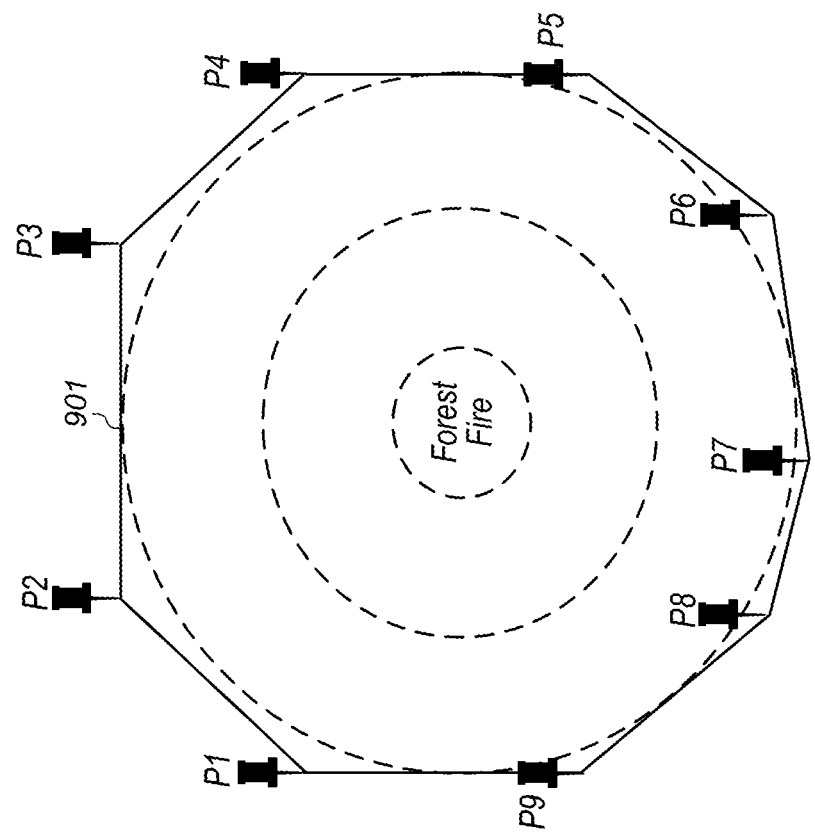
Figure 11:
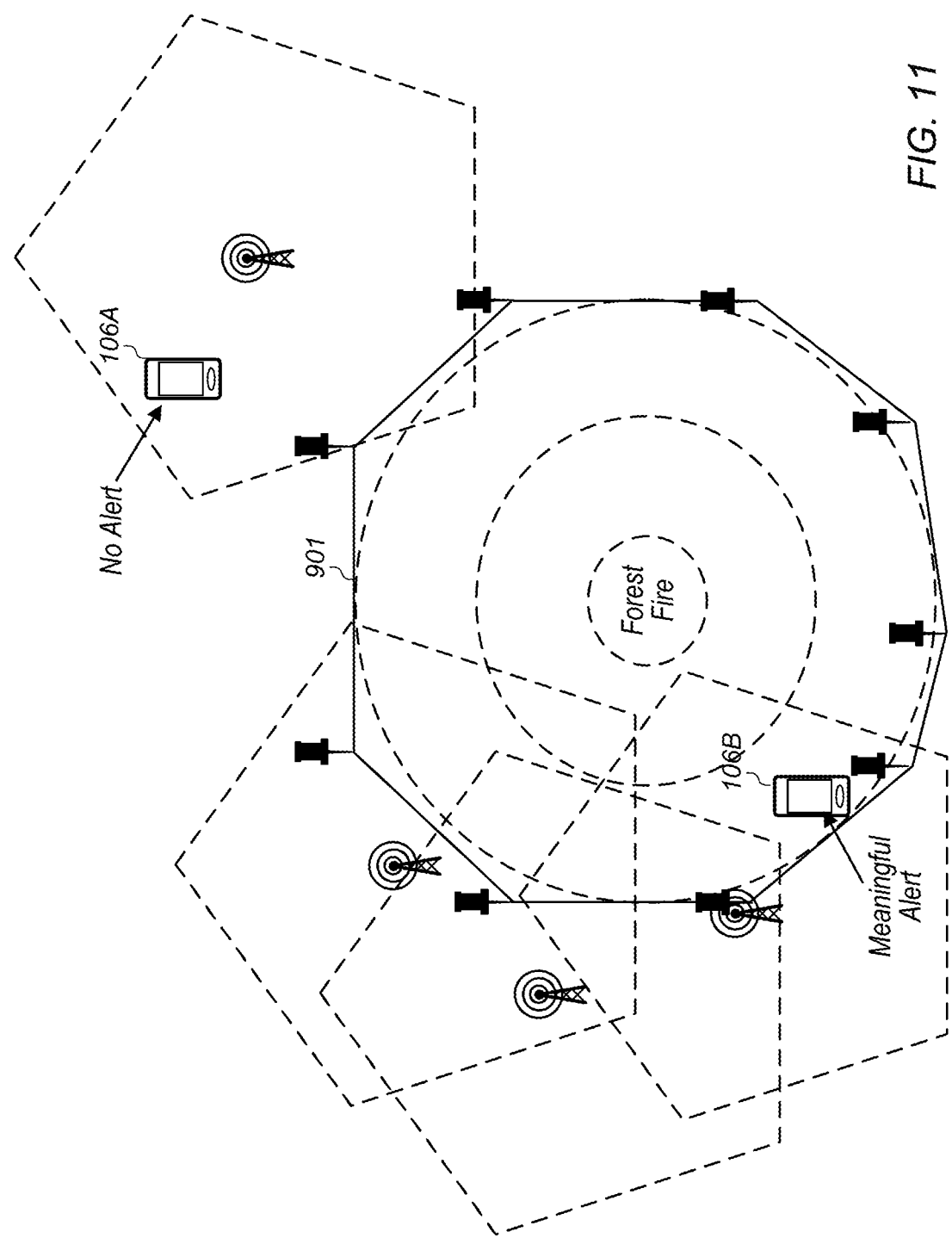

FIGS. 9-11—WEA and Geofencing

FIGS. 9-11 illustrate an emergency (e.g., a forest fire) in relation to a communication system and UEs, according to some embodiments.

FIG. 9 illustrates the case of WEA without geofencing. As shown, both UEs 106A and 106B may be camped on serving cells that overlap with region 901, which is potentially affected by the forest fire. Thus, both UEs 106A and 106B may receive an alert (e.g., without geofencing). Since UE 106A is outside of region 901, the alert received by UE 106A may be considered a false or unnecessary alert. However, since UE 106B is inside the affected region 901, the alert may be considered meaningful for UE 106B.

FIG. 10 illustrates region 901. As shown, a geofence describing region 901 may be defined by a number of coordinates (e.g., P1-P9). The coordinates may define a polygon. Such a polygon may be any shape, e.g., including any number of sides. The polygon may be a regular or irregular polygon. Alternatively, the geofence may be defined using other systems (e.g., coordinate of a center of a circle and an associated radius). It will be appreciated that any number of polygons and/or circles may be bused to define a geofence. The geofence may describe the region designated to receive an alert.

FIG. 11 illustrates the case of WEA without geofencing. As shown, since UE 106A is outside of region 901, UE 106A may receive the alert but may not display the alert to the user. However, since UE 106B is inside the affected region 901, the alert may be considered meaningful and may be displayed to the user.

Figure 12:
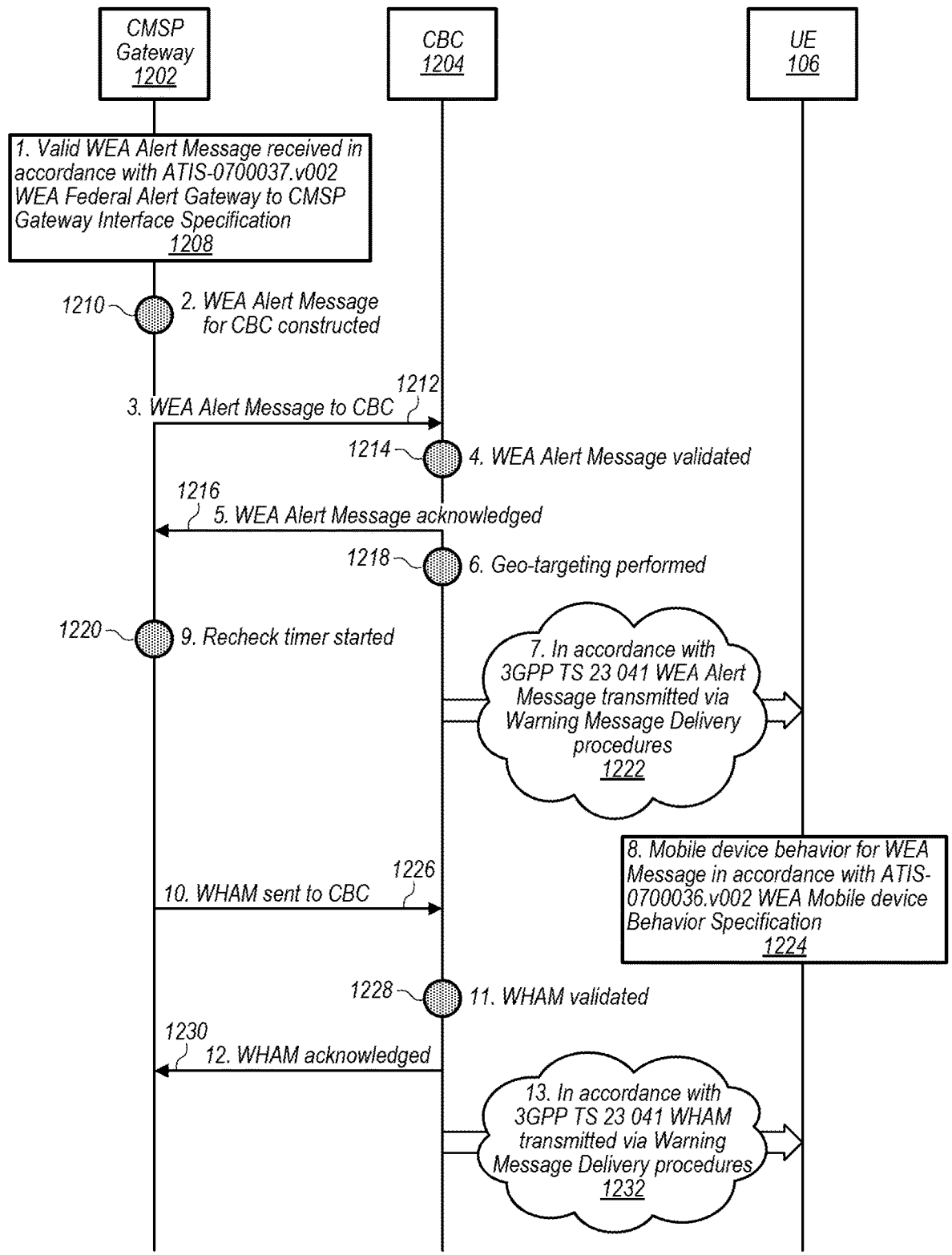
FIGS. 12 and 13 illustrate exemplary WEA flows, according to some embodiments.
Figure 13:
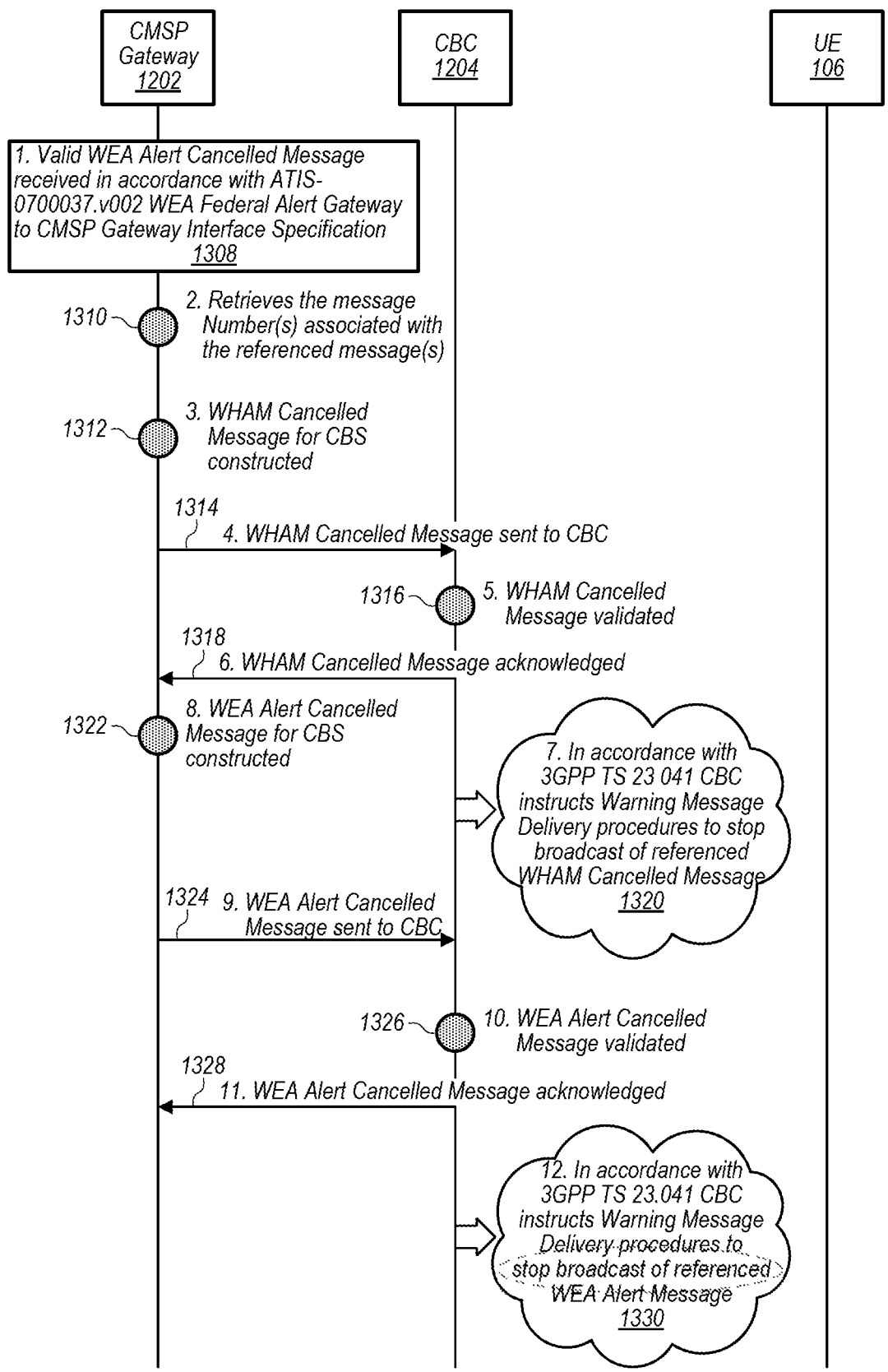

FIGS. 12 and 13—WEA Procedures

FIGS. 12 and 13 are communication flow diagrams illustrating aspects of exemplary WEA procedures, according to some embodiments. As shown, commercial mobile service providers (CMSP) gateway 1202 may communicate with cell broadcast center (CBC) 1204, which may in turn communicate with one or more UEs 106. Note that a baseband processor or application processor of the UE may cause the UE to perform some or all of the illustrated method elements. Note that while at least some elements of the methods are described in a manner relating to the use of communication techniques and/or features associated with 3GPP and/or ATIS specification documents, such description is not intended to be limiting to the disclosure, and aspects of the methods may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the methods may operate as follows.

FIG. 12 illustrates the transmission of an alert and associated WHAM. CMSP gateway 1202 may receive a valid alert (1208), e.g., from a governmental alert gateway in accordance with ATIS-0700037. The CMSP may construct an alert for transmission to the CBC (1210) and may transmit the alert to the CBC (1212). The CBC 1204 may validate the alert (1214), acknowledge the alert (1216), and perform geotargeting (1218). The geotargeting performed by the CBC 1204 may include determining which BS 102 (or multiple BSs 102) should transmit the alert to UEs 106. The CMSP gateway 1202 may start a recheck timer (1220) to periodically confirm that the alert remains valid, e.g., according to operator policy. The CBC may cause a BS 102 to transmit the alert to UE 106 (1222). The alert may include parameters for a geofence. In some embodiments, the alert may include information related to an expected schedule of future communications about the alert (e.g., timing and/or periodicity of WHAM messages, expiration of the alert, etc.).

The UE may process the alert (1224) as per ATIS-0700036. For example, the UE may provide the alert to a baseband processor, store the alert, determine if the alert is a duplicate, and/or evaluate the location of the UE relative to the geofence. In some embodiments, the UE may begin monitoring its location relative to the geofence. Based on the location relative to the geofence, the UE may determine whether or not to display the alert to the user. The UE may consider language of the phone and the transmitted alert in making this decision.

CMSP gateway 1202 may send a WHAM to the CBC 1204 (1226). The CBC may validate the WHAM (1228), acknowledge the WHAM (1230), and transmit the WHAM to the UE (1232). The UE may process the WHAM. For example, the UE may perform a point-in-polygon or other geofence check to determine whether it is inside the geofence. In some embodiments, based on ongoing monitoring of the UE's location relative to the geofence, the UE may not need to perform a geofence check. Based on the location relative to the geofence, the UE may determine whether or not to display the alert to the user.

FIG. 13 illustrates cancellation of an alert, according to some embodiments. The CMSP gateway 1202 may receive an WHAM/alert cancelled message from a governmental alert gateway (1308). The CMSP gateway may retrieve the numbers (e.g., message ID, serial number, etc.) associated with the WHAM/alert (1310), use the numbers to construct a message to the CBC to indicate the cancellation (1312), and transmit the cancellation message (1314).

The CBC 1204 may validate the WHAM/alert cancellation message (1316) and transmit an acknowledgement (1318). In response to the cancellation, the CBC may stop broadcasting further WHAM related to the alert (1320).

The CMSP gateway may further construct a WEA/alert cancellation message (1322) and transmit the WEA/alert cancellation message to the CBC (1324).

The CBC may validate the WEA/alert cancellation message (1326) and transmit an acknowledgement (1328). In response to the cancellation, the CBC may stop broadcasting further WEA related to the alert (1330).

In some embodiments, in addition to stopping broadcasting of further WHAM and/or WEA related to the alert (e.g. in 1320 and/or 1330), the CBC may also transmit a cancellation message to the UE 106. The cancellation message may indicate to the UE that the alert is cancelled. The cancellation message may include the numbers (e.g., message ID, serial number, etc.) associated with the WHAM, WEA, and/or alert. In some embodiments, the cancellation message may be transmitted in response to a query from one or more UEs. In other embodiments, the cancellation message may be transmitted without receiving a query from any UE. The cancellation message may be broadcast to multiple UEs, transmitted to a single UE using a dedicated transmission, or multicast to a subset of UEs.

ADDITIONAL INFORMATION AND EXAMPLES

In one example, a UE may connect to a base station (e.g., in 802) and receive an alert from the base station (e.g., in 804). At a first time after receiving the alert, the UE may determine that it is outside the geofence (e.g., in 806). Accordingly, the UE may determine not to provide/display the alert to the user. The UE may monitor its location relative to the geofence. At a second time, the UE may determine that its location has changed and that it has entered the region defined by the geofence. If, at the second time or prior to the second time, the UE determines that the alert is inactive (e.g., in 810), the UE may not provide the alert to the user (e.g., in 812). Such a determination that the alert is inactive may be based on any of the techniques disclosed herein, among various possibilities. For example, the determination may be based on a cancellation indication, an expiration time, monitoring of alert messages (e.g., in 808), and/or a query to a BS 102. However, if, at the second time, the UE has not determined that the alert is inactive or has determined that the alert remains active (e.g., in 810), the UE may provide the alert to the user (e.g., in 812).

In some embodiments, the UE may track a plurality of different alerts simultaneously, e.g., according to the methods of FIG. 8. For example, the UE may make separate determinations of whether it is inside the geofences of multiple alerts, and/or may make separate determinations of whether or not such multiple alerts are active at any time.

In a first set of embodiments, a wireless user equipment device (UE), may comprise: a radio; and a processor operably coupled to the radio and configured to cause the UE to: establish a connection with a base station; receive an alert from the base station, wherein the alert specifies a geofence; at a first time: determine that a first location of the UE is outside the geofence; and determine, in response to the determination that the first location of the UE is outside the geofence, not to display the alert; and at a second time, subsequent to the first time: determine that a second location of the UE is inside the geofence; determine that the alert is inactive; and determine, in response to the determination that the alert is inactive, not to display the alert.

In some embodiments, the processor may be configured to cause the UE to display the alert (e.g., at the first time, or any time prior to determining that the alert is inactive, e.g., at the second time) if the processor or UE determines that the UE is inside the geofence.

In some embodiments, the determination that the alert is inactive is based on a cancellation received from the base station.

In some embodiments, the cancellation received from the base station is in response to a query transmitted by the UE.

In some embodiments, the cancellation received from the base station is a wireless handset action message (WHAM) including a list of expired alerts.

In some embodiments, the determination that the alert is inactive is based on an analysis of timing of multiple messages received from the base station related to the alert.

In some embodiments, the analysis includes determining a periodicity of the multiple messages.

In some embodiments, the determination that the alert is inactive is based on not receiving a further message at a time determined based on the periodicity.

In some embodiments, the determination that the alert is inactive is based on an expiration time of the alert.

In a second set of embodiments, an apparatus for operating a user equipment device (UE), the apparatus may comprise: a processor configured to cause the UE to: establish communication with a base station; receive, from the base station, a first alert, wherein the first alert indicates a geofence; begin monitoring a current location of the UE relative to the geofence; receive, from the base station, a plurality of further alert messages related to the first alert; determine a periodicity of the plurality of further alert messages; determine, based on the periodicity, at least one time of at least one additional further alert message; determine that the at least one additional further alert message is not received at the at least one time; determine, based on the determination that the at least one additional further alert message is not received at the at least one time, that the first alert is inactive; and in response to the determination that the first alert is inactive, discontinue monitoring the current location of the UE relative to the geofence.

In some embodiments, the processor may be configured to cause the UE to display the first alert (e.g., at any time prior to determining that the first alert is inactive) if the monitoring of the current location of the UE relative to the geofence indicates that the current location of the UE is inside the geofence.

In some embodiments, the periodicity is specific to a radio access technology.

In some embodiments, the periodicity is specific to a tracking area.

In some embodiments, the periodicity is specific to a radio access technology.

In some embodiments, to determine that the first alert is inactive, the processor is further configured to cause the UE to: correct for a cell change at the at least one time.

In some embodiments, to determine that the first alert is inactive, the processor is further configured to cause the UE to correct for an out of service state at the at least one time.

In some embodiments, to discontinue monitoring the current location of the UE relative to the geofence, the processor is further configured to cause the UE to reduce a storage timer of the alert.

In some embodiments, an amount by which the storage timer is reduced is based on a number of additional further alert message not received at the at least one time.

In a third set of embodiments, a method for operating a base station (BS), the method may comprise: at the BS: establishing communication with a user equipment device (UE); receiving an alert from a network element; transmitting the alert to the UE; receiving, from the network element, a cancellation of the alert; and transmitting, to the UE, an indication of the cancellation of the alert.

In some embodiments, the indication of the cancellation of the alert is transmitted in response to a query from the UE.

In some embodiments, the indication of the cancellation of the alert is transmitted in response to receiving the cancellation of the alert from the network element.

In some embodiments, the indication of the cancellation of the alert is broadcast to a plurality of UEs.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment device (UE), comprising:
   communication circuitry; and
   a processor operably coupled to the communication circuitry and configured to cause the UE to:
      establish a connection with a base station;
      receive a wireless emergency alert (WEA) from the base station, wherein the WEA comprises: a message, a geofence, and an expiration time of the WEA;
      at a first time:
         determine that a location of the UE at the first time is outside the geofence; and
         determine, in response to the determination that the location of the UE at the first time is outside the geofence, not to display the message; and
      at a second time, subsequent to the first time:
         determine that the WEA is inactive based on a comparison of a current time to the expiration time of the WEA; and
         determine, in response to the determination that the WEA is inactive, not to display the alert message regardless of whether a location of the UE at the second time is outside the geofence.

2. The wireless UE of claim 1, wherein the processor is further configured to cause the UE to:
   receive an indication of an end of the WEA.

3. The wireless UE of claim 2, wherein the indication of the end of the WEA comprises a tag-length-value (TLV).

4. The wireless UE of claim 1, wherein the processor is further configured to cause the UE to:
   at the second time, determine to discontinue monitoring of the geofence.

5. The wireless UE of claim 1, wherein the processor is further configured to cause the UE to:
    transmit, to the base station a query about a status of the WEA.

6. The wireless UE of claim 1, wherein the processor is further configured to cause the UE to:
    receive, from the base station, a wireless handset action message (WHAM) regarding the WEA, wherein the WHAM includes the expiration time of the WEA.

7. The wireless UE of claim 1, wherein the WEA includes information related to an expected schedule of future communications about the WEA.

8. A method, comprising:
    at a user equipment device (UE):
        establishing a connection with a base station;
        receiving a wireless emergency alert (WEA) from the base station, wherein the WEA comprises: a message, a geofence, and an expiration time of the WEA;
        at a first time:
            determining that a location of the UE at the first time is outside the geofence; and
            determining, in response to the determination that the location of the UE at the first time is outside the geofence, not to display the message; and
        at a second time, subsequent to the first time:
            determining that the WEA is inactive based on a comparison of a current time to the expiration time of the WEA; and
            determining, in response to the determination that the WEA is inactive, not to display the message regardless of whether a location of the UE at the second time is outside the geofence.

9. The method of claim 8, further comprising:
    receiving an indication of an end of the WEA.

10. The method of claim 9, wherein the indication of the end of the WEA comprises a tag-length-value (TLV).

11. The method of claim 8, further comprising:
    at the second time, determining to discontinue monitoring of the geofence.

12. The method of claim 8, further comprising:
    transmitting, to the base station a query about a status of the WEA.

13. The method of claim 8, further comprising:
    receiving, from the base station, a wireless handset action message (WHAM) regarding the WEA, wherein the WHAM includes the expiration time of the WEA.

14. The method of claim 8, wherein the WEA includes information related to an expected schedule of future communications about the WEA.

15. A non-transitory computer readable medium comprising:
    program instructions, the program instructions configured to cause a user equipment device (UE) to perform operations comprising:
    establishing a connection with a base station;
    receiving a wireless emergency alert (WEA) from the base station, wherein the WEA comprises: a message, a geofence, and an expiration time of the WEA;
    at a first time:
        determining that a location of the UE at the first time is outside the geofence; and
        determining, in response to the determination that the location of the UE at the first time is outside the geofence, not to display the message; and
    at a second time, subsequent to the first time:
        determining that the WEA is inactive based on a comparison of a current time to the expiration time of the WEA; and
        determining, in response to the determination that the WEA is inactive, not to display the message regardless of whether a location of the UE at the second time is outside the geofence.

16. The non-transitory computer readable medium of claim 15, the operations further comprising:
    receiving an indication of an end of the WEA.

17. The non-transitory computer readable medium of claim 16, wherein the indication of the end of the WEA comprises a tag-length-value (TLV).

18. The non-transitory computer readable medium of claim 15, the operations further comprising:
    at the second time, determining to discontinue monitoring of the geofence.

19. The non-transitory computer readable medium of claim 15, the operations further comprising:
    transmitting, to the base station a query about a status of the WEA.

20. The non-transitory computer readable medium of claim 15, the operations further comprising:
    receiving, from the base station, a wireless handset action message (WHAM) regarding the WEA, wherein the WHAM includes the expiration time of the WEA.

* * * * *